April 5, 1955  F. FISHER  2,705,340
APPARATUS FOR PULLING THE LEG TENDONS OF POULTRY
Filed Jan. 22, 1952  3 Sheets-Sheet 2
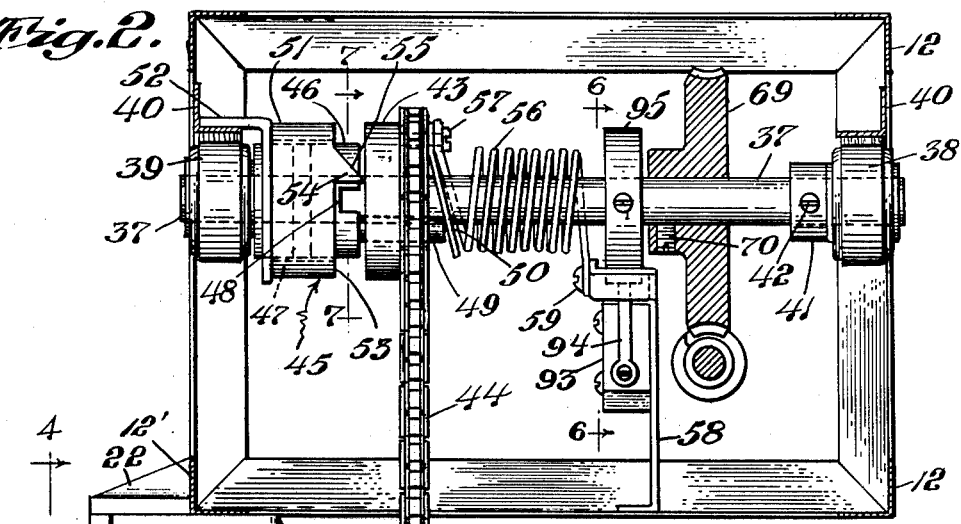
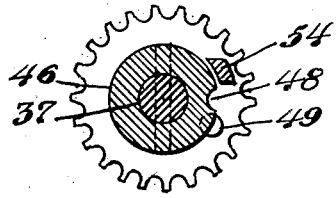
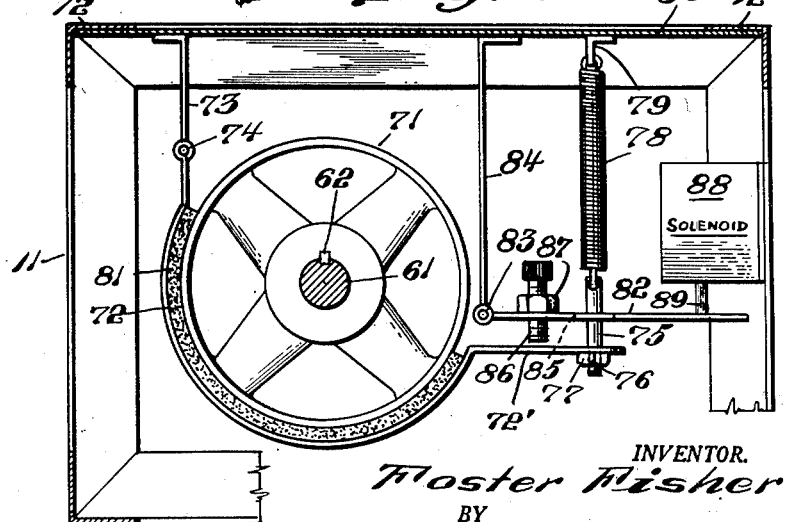
INVENTOR.
Foster Fisher
BY
Barlow & Barlow
ATTORNEYS.

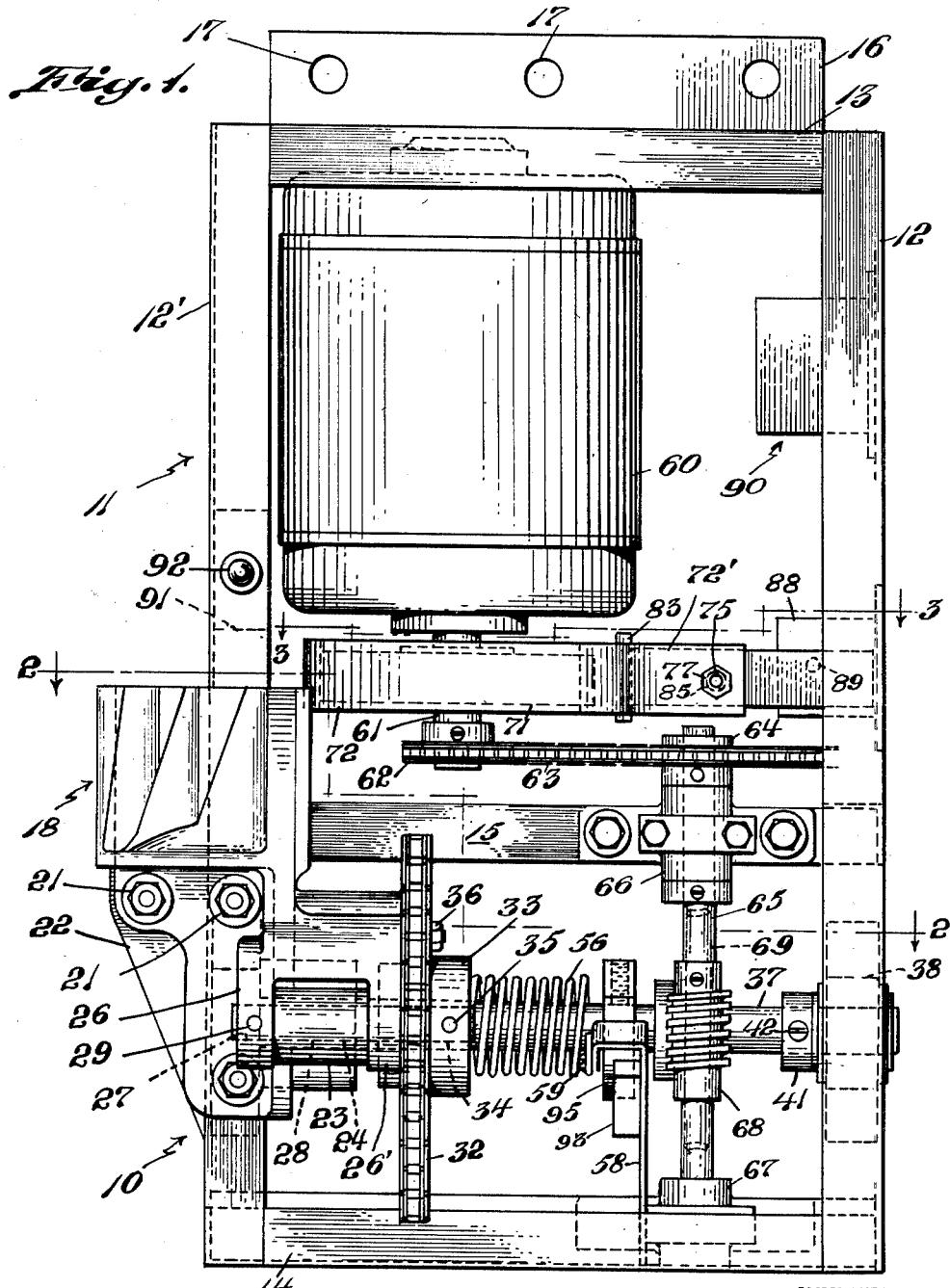

April 5, 1955 F. FISHER 2,705,340
APPARATUS FOR PULLING THE LEG TENDONS OF POULTRY
Filed Jan. 22, 1952 3 Sheets-Sheet 3
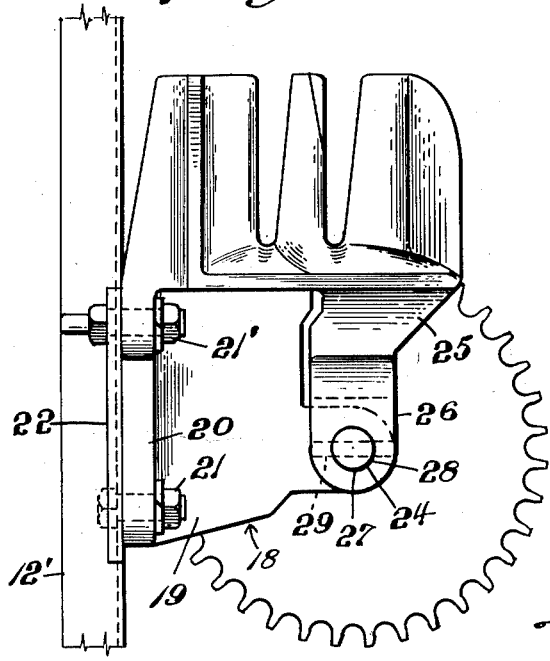
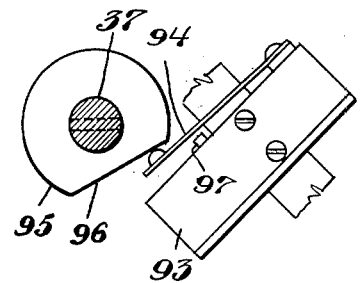
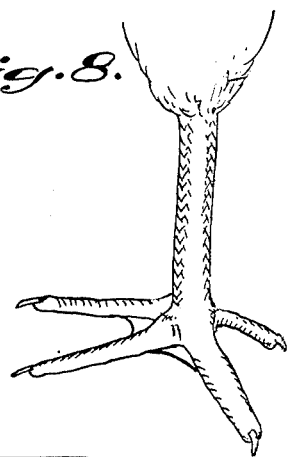
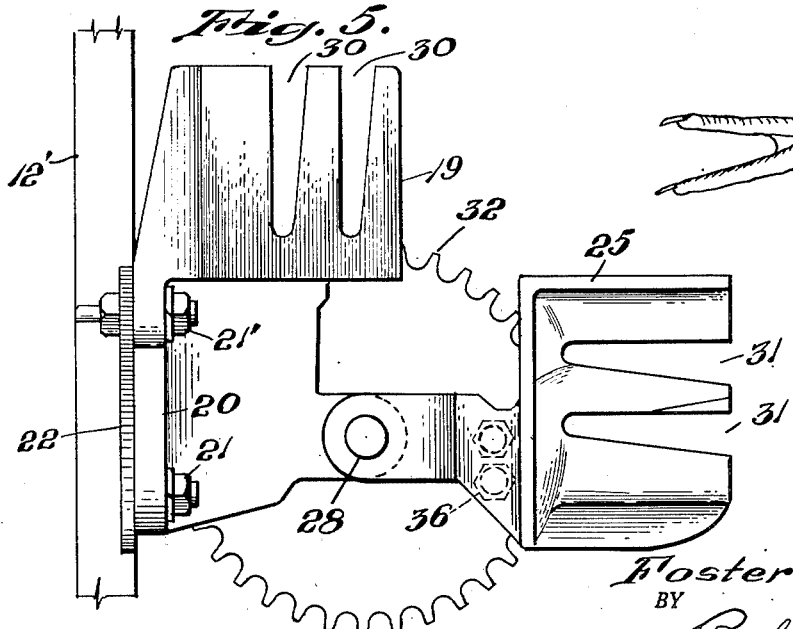
INVENTOR.
Foster Fisher
BY
Barlow & Barlow
ATTORNEYS.

United States Patent Office 2,705,340
Patented Apr. 5, 1955

2,705,340

APPARATUS FOR PULLING THE LEG TENDONS OF POULTRY

Foster Fisher, Providence, R. I.

Application January 22, 1952, Serial No. 267,593

8 Claims. (Cl. 17—11.3)

This invention relates to an apparatus for pulling leg tendons from poultry and/or the like.

In marketing poultry in a condition ready for the oven, an eviscerated bird in which the leg tendons have been removed may bring a higher premium or be more salable than a bird in which the leg tendons have not been removed. The manual removal of such tendons is a difficult task and such apparatus of which I am familiar for mechanically pulling the leg tendons of poultry are comparatively expensive and are not economical in small poultry dressing plants.

An object of the invention is to provide an apparatus for pulling leg tendons from poultry, which may be manufactured at a comparatively low cost and which will be durable and satisfactory in use.

Another object of the invention is to provide an apparatus of the above character in which a pair of jaws will be so constructed as to hold the leg of the bird by a wedging action.

Another object of the invention is to provide an apparatus of the above character wherein the operation of removing the leg tendons of a bird will take place in but a single revolution of the drive shaft of the apparatus.

Another object of the invention is to provide an apparatus of the above character in which jaws will be provided for holding the leg of the bird, which jaws will be moved relative to each other in a direction laterally of the said leg to break and separate the same to pull the tendons from the thigh of the leg.

Another object of the invention is to provide an apparatus of the above character in which a drive shaft will control the sequence of the operation of the apparatus through the control of an electrical switch.

With these and other objects in view, the invention consists of certain novel features of construction as will be more fully described and particularly pointed out in the appended claims.

In the accompanying drawings:

Figure 1 is a front elevational view of an apparatus adapted for pulling leg tendons from poultry and embodying one form of the invention;

Figure 2 is a sectional view taken substantially along line 2—2 of Figure 1 and looking in the direction of the arrows thereon;

Figure 3 is a sectional view taken along lines 3—3 of Figure 1;

Figure 4 is a side elevational view of the jaw portion of the apparatus looking in the direction of the arrows on line 4—4 of Figure 2;

Figure 5 is a similar view but with the jaws shown in partial open position;

Figure 6 is a sectional view taken substantially along line 6—6 of Figure 2 showing a cam means for operating a control switch;

Figure 7 is a sectional view taken substantially along line 7—7 of Figure 2; and Figure 8 is a perspective view of a poultry leg.

The term "poultry" is herein used to indicate domestic birds such as turkeys, capons, chickens, fowls, and other birds adapted to be used for food.

Referring to the drawings for a more detailed description of the invention, 10 designates generally an apparatus adapted for pulling leg tendons of poultry and comprises an open frame 11 which may be conveniently made of lengths of angle iron welded together so as to form a rectangular structure having corner uprights 12 joined at their upper edge by lateral extending or cross members 13 and at their lower edge by similar laterally extending or cross members 14. The open frame may be further reinforced by means of cross members such as 15 located intermediate the members 13 and 14. At the upper portion of the frame 11 a bracket 16 is welded to the rear member 13 and is provided with a plurality of openings 17 for receiving tie bolts whereby the apparatus may be attached to a support such as a wall at a position thereon at a proper height for presenting the bird to the apparatus.

A pair of jaws designated generally 18 is provided for pulling the leg tendons from the birds. One of said jaws designated 19 (see Fig. 5) has a depending portion 20 which engages against the corner upright 12' and is there secured by means of bolts and nut fastenings 21. The upright 12' also carries a bracket 22 which may be welded to the upright 12' and provides an additional area for the portion 20 to rest against and receive one of the bolts and nut fastenings 21' whereby said jaw is securely held stationary. A boss 23 having a bearing opening 24 extending therethrough (see Fig. 1) is carried by the jaw 19 at a position forward of the portion 20. The other jaw 25 of said pair of jaws has a depending portion which terminates in spaced ears 26—26' which have aligned openings 27 therethrough (see also Figs. 4 and 5). These ears straddle the boss 23, and the openings 27 thereof align with the opening 24 and receive therethrough a pivot pin 28 which mounts the jaw 25 for pivotal movement relative to the jaw 19. A lock pin 29 extends through the ear 26 and through the pin 28 to secure the jaw 25 to the pin 28 to turn therewith.

As is well known, the leg of poultry (see Fig. 8) has an enlargement at the joint of the shank thereof to the foot portion and also an enlargement at the hock joint. These two enlargements provide abutments against which a pulling or sepaarting force may be applied to pull the leg tendons from the thigh upon severing of the shank leg bone such as by breaking the same. To this end the jaw 19 is provided with a pair of slots 30 opening in the upper edge of the jaw, and the side walls thereof converge inwardly so as to provide a tapered slot to receive the legs of a bird at the location adjacent to the foot portion thereof, the taper of the slot providing for a wedging action to firmly hold the legs of the bird. The jaw 25 is likewise provided with a pair of slots 31 which open at the upper edge of the jaws and with the side walls of the slot converging inwardly in a manner similar to the slots 30 to receive the legs of a bird in wedged position therein. When the jaws are in the closed position as shown in Figures 1, 2, and 4, these slots 30, 31 align with each other and extend in a direction (see Fig. 1) parallel to the axis of said pivot pin 21. Upon the movement of said jaw 25 from the jaw 19, a force will be exerted on the legs of the bird in a direction tending to pull the said legs through the slots and which will be blocked by the said enlargements at the said hock and foot joints of the leg. This force applied in the separation of said jaws will be in a direction to bend and break the shank bone of the leg. Upon further separation of said jaws and the breaking of said shank bone, the tissue of the said shank will be pulled apart and the tendons more firmly anchored to the foot portion will be pulled from the thigh of the said legs.

In order to mechanically move said jaws for the separation thereof, a sprocket wheel 32 having a hub portion 33 is provided with a central opening 34 therethrough for receiving the inward end portion of the pivot pin 28 and is attached to said pin by means of a fastening pin 35. The jaw 25 is attached to said sprocket gear 32 as by means of bolt fastenings 36 whereby said jaw 25 will move in unison with the gear 32. The sprocket gear 32 is driven by means of a drive shaft 37 (see Fig. 2) journaled in bearings 38, 39 which are attached to upright supports 40 which may also be angle irons welded in place to the sides of the frame 11. A collar 41 is attached to the shaft 37 adjacent to the bearing 39 as by means of a pin fastening 42 so as to prevent axial movement of said shaft toward said bearings 38. A drive sprocket gear 43 is mounted on the shaft 37 so as to have free rotation thereon and is operatively connected to the gear 32 by a flexible belt such as sprocket chain 44 for transmitting motion from said drive gear 43 to the gear 32.

The sprocket gear 43 is operatively connected to rotate with the shaft 37 by means of a one-revolution clutch designated generally 45 which comprises a collar 46 attached to the shaft 37 as by means of a pin fastening 47. One edge of this collar 46 is at a position adjacent the bearing 39 so as to prevent axial movement of the shaft toward the bearing 39. This collar 46 extends to adjacent the hub of the drive gear 43 and is there provided on said adjacent edge with an opening 48 (see Fig. 7) which is preferably semi-circular in cross section. The gear 43 has an opening laterally therethrough in which is received a plunger 49 (see Fig. 2) which is urged by means of a flat spring 50 to move toward and into engagement with the edge of the collar 46. The plunger 49 is circular in cross section and substantially the diameter of the semi-circular opening 48. When said opening is positioned in line with the said plunger 49, said plunger will under the urge of the spring 50 move into the said opening 48 to connect or clutch said gear 43 for rotation with said collar 46. The plunger 49 will project above the outer periphery of the collar 46. Encircling the collar 46 is a cam member 51 which is held stationary with reference to said collar 46 as by means of a bracket 52 carried by the upright 40 to which the bearing 39 is attached. The cam 51 is spaced inwardly of the bottom edge of the opening 48 and is provided with a cam abutment 54 projecting beyond the inner edge of collar 46. This abutment 54 is provided with a slanted surface 55 on which the portion of the pin 49 extending above the periphery of the collar 46 will ride and be moved out of said opening 48 against the urge of the spring 50 thereby declutching the gear 43 to permit the free movement thereof on the shaft 37. Upon the removal of the plunger 49 from engagement with the opening 48, the said drive gear 43 will be rotated in the reverse direction to reposition the same at its initial location as by means of a torsion spring 56 which encircles the shaft 37 and has one end anchored to the gear 43 and there fastened by means of a screw fastening 57, and its other end secured to a support 58 as by means of a screw fastening 59 (see Fig. 2). Upon the rotation of said gear 43 in a direction to turn the sprocket gear 32 to open the jaws, the said spring 56 will be charged. Upon release of the gear 43 from the collar 46 in the manner previously described, the force of said spring will return the gear to initial position and thereby move the sprocket 32 to move the jaws to closed position.

The shaft 37 is in turn driven from a power source which in the instant case is an electric motor 60 (see Fig. 1) which is mounted in the upper portion of the frame 11 and with its shaft 61 extending in a vertical direction and having secured thereto a sprocket gear 62 which in turn drives through a sprocket chain 63 a sprocket gear 64. The sprocket gear 64 is mounted on a vertical shaft 65 which is journaled in bearings 66, 67 which are attached to cross members 14, 15 of the said frame 11. There is mounted on the shaft 65 a worm 68 which engages a worm gear 69 which is mounted on the shaft 37 and secured thereto as by means of a screw 70 (see Fig. 2). Thus the speed of the shaft 61 is reduced through the said gear to rotate the shaft 37 at a predetermined much slower speed.

It is essential that the drive shaft 37 be brought to rest instantly upon the declutching of gear 43. To this end a brake pulley 71 (see Figs. 1 and 3) is attached to the shaft 61 as by means of a spline fastening 62. A brake band designated generally 72 partially encircles the periphery of the brake pulley 71 and has one end thereof hingedly attached to a bracket 73 as at 74. The other end 72' of the band 72 has fixed thereto an anchor 75 which may be in the form of a rod having a threaded end 76 extending through the portion 72' to be attached thereto as by means of a nut fastening 77. A pull spring 78 has one end anchored to the pin 75 and its other end attached to a bracket 79 which may be affixed to a plate 80 extending between the uprights 12 at the rear side of the frame 11, this spring 75 exerting a resilient force on said band 72 to move the same toward the brake wheel 71. Band 72 is provided with a brake shoe 81 to engage the brake wheel 71 to apply a sufficient friction thereto to bring the same to rest. The brake 72 is moved out of engagement with the wheel 71 by means of a member 82 which is hingedly mounted as at 83 to a bracket 84 projecting from the plate 80. This member 82 has an opening 85 through which the member 75 passes and is also provided with an adjustable abutment in the form of a threaded member 86 threadedly engaging the member 82 and locked into adjusted position by means of a check nut 87. A solenoid 88 is attached to the uprights 12 so as to position its movable plunger 89 in position to engage the member 82 and when energized will move said member 82 about the pivot 83 for the abutment 86 to engage the band 72 to move the same out of engagement with the brake wheel 71. The solenoid 88 is in turn controlled by an electrical relay device designated generally 90 (see Fig. 1) which is placed into the circuit of the motor 60 and which circuit is manually controlled by means of a switch indicated generally 91 having a push button 92. The motor circuit (not shown) also includes a micro or like switch 93 (see Fig. 6) having a flexible arm 94 which is engaged by a cam 95 mounted on the shaft 37 so as to rotate therewith. The cam has a flat 96 which when positioned opposite arm 94 provides for the arm 94 to move to open position. The timing is such that the flat 96 will be at the position shown in Figure 6 when the shaft 37 is at rest. This switch is in turn connected to the relay 90. Upon closing of the circuit by manual moving of the push button 92, the said motor will be energized and the shaft 37 rotated, upon which rotation the free end of the arm 94 will ride on the periphery of the cam 95 to flex the same to close the switch 93 through engaging the button 97 thereof. This closing of switch 93 will hold the electric motor circuit closed upon the release of the push button 92. The action of closing of the switch 93 will also energize the relay 90 to in turn energize the solenoid 88 to move the plunger 89 to move the brake shoe 81 from engagement with the brake wheel 71. Just prior to the shaft 37 making one revolution, the said flat 96 will again be brought into the position shown in Figure 6 to permit movement of arm 94 to open switch 93 whereby the motor circuit will be opened to de-energize the relay and solenoid 88 to permit withdrawal of its plunger 89 to permit the brake 72 to be applied to the wheel 71 through the action of the pull spring 78. The timing of the moving parts of the apparatus is such that when the plunger 49 is disengaged with the collar 46, the opening 48 will be at a position just ahead of the plunger 49 when the gear 43 is returned in the opposite direction to the initial position thereof as shown in Figure 7 thereby preventing the re-engagement of the pin 49 with the opening 48 prior to again energizing the motor circuit.

The operation of the several parts of the apparatus has been given in connection with the detailed description thereof and a brief general description of the apparatus as a whole will suffice in order to clearly understand its mode of operation.

In operation the operator holds the bird in position with the legs thereof placed in the aligned slots 30, 31 indicated in dotted lines indicated L in Figure 2. The button 92 may now be pressed to close the motor circuit upon which closing the shaft 37 will be rotated and the collar moved to align opening 48 with plunger 49 so as to permit the clutching of gear 43. Motion of gear 43 will be transmitted through belt 44 to gear 32 to move jaws in the separation thereof. This separation movement of said jaws will, as previously described, apply a force on to the shank of the leg intermediate the foot and hock thereof so as to cause a bending and then a breaking thereof and upon further separating movement of said jaws, tissues of said broken leg portions will be pulled apart and the tendons pulled out of the thigh of the leg. Upon said jaws opening in an arc which may be greater than 90° or in a distance sufficient for the tendons to be pulled completely out of the thigh, the said plunger 49 will be in a position to engage the surface 55 upon which said end of said plunger will ride to withdraw the same from the opening 48 and clear of the collar 46. Upon the removal of said plunger 49 from engagement with the opening 48, the spring 46 which will have been charged by the rotation of the gear 43 will exert a force on said gear in the opposite direction to rotate the same about the shaft 37 to position the same in the initial position. At the instance of the removal of the pin 49 from engagement with the collar 46 or just subsequent to this action, the cam 95 will have turned to place the flat 96 opposite the arm 94 to permit the same to move from the button 97 and thereby open the motor circuit at the switch 93. This action will also cause the de-energizing of the relay 90 and solenoid 88 to permit withdrawal of its plunger as previously described to free the brake 72 to be moved into engagement with the brake wheel, thereby bringing the drive shaft 37 to rest and with the opening 48 at the position shown in Figure 7.

I have shown the jaws 19, 25 as pivotally related. However, the invention contemplates broadly the separation of said jaws other than by a relative pivotal movement.

I claim:

1. An apparatus for pulling the leg tendons of poultry and the like comprising a pair of jaws each having means thereon for holding the leg of the bird at a location thereon between the hock joint and foot, said jaws being mounted for relative movement towards and from each other, drive means for said jaws including a drive shaft, a gear mounted on said shaft for free rotative movement thereon, clutch means for rotating said gear in unison with said shaft, and resilent means secured to said gear for rotatively returning said gear to initial position upon being declutched from said shaft.

2. An apparatus as set forth in claim 1 wherein said clutch means comprises a member fixed for rotation with said shaft, interengaging means between said gear and said member for operatively connecting said gear to said member for rotation therewith, means for moving said interengaging means to connect said gear to said member and cam means for moving said interengaging means out of engagement with each other.

3. An apparatus as set forth in claim 1 wherein said clutch means include a collar fixed to said shaft for rotation therewith and having an opening therein, a spring pressed plunger carried by said gear and adapted to be received in said opening when aligned with ecah other for connecting said gear for rotation with said collar, and a cam held stationary relative to said collar and gear and positioned to engage said plunger to move the same out from said opening at each revolution of said shaft.

4. An apparatus as set forth in claim 3 further comprising means for bringing said shaft to rest upon said gear being declutched from said collar.

5. An apparatus as set forth in claim 3 further comprising a motor, a drive from said motor to said shaft, a brake for said motor, and means operable upon said plunger being moved out of engagement with said collar for applying said brake to said motor to bring said shaft to rest.

6. An apparatus for pulling the leg tendons of poultry and the like comprising a pair of jaws for holding the leg of the bird between the hock and foot of said leg, one of said jaws being fixed to be held stationary, the other of said jaws being rotatively mounted for movement from the other jaw in a direction laterally of the length of the leg held in said jaws, means for rotatively moving the said other jaw including a gear fixed thereto, a drive shaft, a drive gear mounted on said drive shaft for free rotation thereon, flexible means operatively connecting said gears, clutch means for clutching said drive gear to said shaft, cam means operable to declutch said drive gear from said shaft, and resilient means for returning said drive gear to initial relation on said shaft upon the declutching of said drive gear to move said jaws to the closed position.

7. An apparatus for pulling the leg tendons of poultry and the like comprising a pair of jaws, one of which is rotatably mounted for swinging movement to and from the other, each of said jaws having a face engageable one with the other and extending at an angle less than a right angle with reference to the axis of rotation of said rotatable jaw and to a plane passing perpendicular to said axis, means on said jaws for receiving the leg of a bird to position said leg across said faces in a plane substantially parallel to the said axis of rotation, said means holding said leg between the hock joint and the foot thereof whereupon the opening movement of said jaws will exert a force on said leg in a direction both laterally and lengthwise of the said leg, and mechanically operated means for swinging said movable jaw towards open position.

8. An apparatus as set forth in claim 7 wherein the said means on said jaws for receiving the said leg is a tapered slot on each jaw extending through said faces and aligned one with the other and extending in a plane substantially parallel to the said axis of rotation.

References Cited in the file of this patent

UNITED STATES PATENTS

| | | |
|---|---|---|
| 941,759 | Congdon | Nov. 30, 1909 |
| 1,629,349 | MacDonald | May 17, 1927 |
| 1,912,124 | Braumuller | May 30, 1933 |
| 2,258,884 | Duffy, Sr. | Oct. 14, 1941 |